United States Patent
Lee et al.

(10) Patent No.: US 11,604,925 B1
(45) Date of Patent: Mar. 14, 2023

(54) ARCHITECTURE FOR GAZETTEER-AUGMENTED NAMED ENTITY RECOGNITION

(71) Applicant: Amazon Technologies, Inc., Seattle, WA (US)

(72) Inventors: Kyung Jae Lee, Seattle, WA (US); Charlotte Alizerine Dzialo, Seattle, WA (US); Lan Ma, Seattle, WA (US); Liu Yang, Seattle, WA (US); Yi Qin, Seattle, WA (US); Prathap Ramachandra, Kirkland, WA (US); Wenbo Yan, Seattle, WA (US); Darshan Ashok Fofadiya, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 351 days.

(21) Appl. No.: 16/881,520

(22) Filed: May 22, 2020

(51) Int. Cl.
| | |
|---|---|
| *G06F 17/00* | (2019.01) |
| *G06F 40/295* | (2020.01) |
| *G10L 15/16* | (2006.01) |
| *G06N 3/04* | (2023.01) |
| *G10L 15/197* | (2013.01) |
| *G06F 40/30* | (2020.01) |
| *G06N 3/08* | (2023.01) |
| *G06F 17/18* | (2006.01) |

(52) U.S. Cl.
CPC .......... *G06F 40/295* (2020.01); *G06F 40/30* (2020.01); *G06N 3/0472* (2013.01); *G06N 3/08* (2013.01); *G10L 15/16* (2013.01); *G10L 15/197* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 9,190,055 B1 | 11/2015 | Kiss et al. | |
| 9,558,740 B1 | 1/2017 | Mairesse et al. | |
| 9,836,453 B2 * | 12/2017 | Radford | G06F 16/93 |
| 10,073,673 B2 * | 9/2018 | Brancovici | G06F 40/30 |
| 10,453,117 B1 | 10/2019 | Reavely et al. | |
| 10,839,164 B1 * | 11/2020 | Shorter | G16H 10/20 |
| 11,132,509 B1 * | 9/2021 | Pasko | G06K 9/6267 |
| 2020/0065374 A1 | 2/2020 | Gao et al. | |
| 2020/0143112 A1 * | 5/2020 | Martinez | G06F 40/295 |

* cited by examiner

Primary Examiner — Satwant K Singh
(74) Attorney, Agent, or Firm — Knobbe, Martens, Olson & Bear, LLP

(57) ABSTRACT

Features are disclosed for training and using named entity recognition models based on gazetteer information. A named entity recognition model can be trained with a gazetteer output at a layer of the model to provide deterministic data in the probabilistic model. The named entity recognition model can recognize named entities based on the word embedding and the gazetteer output. The named entity recognition model can tune the gazetteer output to include false positive name entities such that the gazetteer output is not deterministic of the output of the model. In some embodiments, the named entity recognition model can be tuned so as to adjust the gazetteer output.

20 Claims, 6 Drawing Sheets

ARCHITECTURE FOR GAZETTEER-AUGMENTED NAMED ENTITY RECOGNITION

BACKGROUND OF THE INVENTION

Natural language processing systems include various modules and components for receiving textual input from a user and determining what the user meant. In some implementations, a natural language processing system includes an automatic speech recognition ("ASR") module that receives audio data of an utterance of a user and generates text data corresponding to a transcription of the utterance. Natural language processing ("NLP") systems may also include a natural language understanding ("NLU") module that receives text data generated by the ASR module and determines the meaning of the text in a way that can be acted upon, such as by a computer application. The NLU module can identify particular words (e.g., named entities) in the transcription that are of particular importance in determining the user's intent and determine one or more named entities associated with the particular words. The NLU module may also produce a response based on the named entities. An applications module may then receive the response and generate one or more commands for one or more applications. For example, a user of a mobile phone may issue a spoken command to initiate a phone call. Audio of the spoken command can be received and transcribed into textual data by the ASR module. The textual data can be interpreted by the NLU module to correspond to a command to implement a phone call and the command to implement the phone call can be implemented by the applications module.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
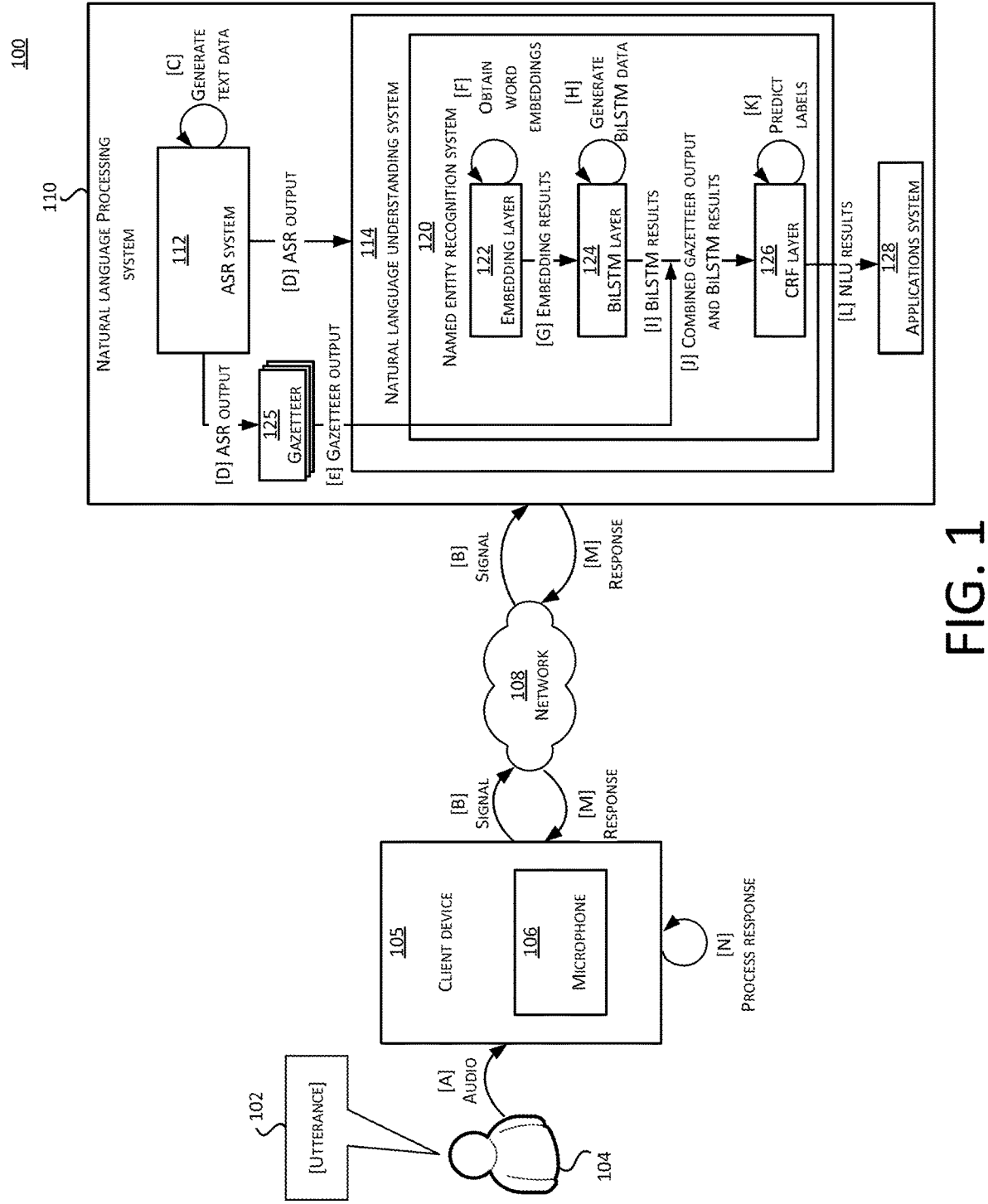
FIG. 1 depicts a schematic diagram of a natural language processing system, including an ASR system and a named entity recognition system in accordance with aspects of the present disclosure.

The present disclosure is directed to a natural language processing ("NLP") system that can receive natural language input and determine the likely meaning of the input. Based on the likely meaning of the input, the NLP system can perform various operations such as generating a command to be performed by an application. The NLP system utilizes a named entity recognition ("NER") model to determine named entity classifications for individual words or word groupings of the natural language input. To determine the named entity classifications, the NER system incorporates gazetteer-based features to improve recall of certain named entities, including those for which there is little-to-no data available when the model is trained. Therefore, output of the NER system represents categories or classifications that the named entity recognition model has not only learned from analyzing a corpus of natural language training data, but also those that the NER system has been configured to recognize using gazetteers. As a result, words in natural language input can be analyzed and recognized accurately by using NER results generated for the inputs.

In many conventional cases, implementing a general NER system on input data may not provide satisfactory results in particular circumstances or for particular users (e.g., some input may include words or phrases not typically used by the general population, or used differently than by the general population). Further, certain inputs may include words or phrases that are associated with new entities that may not have been learned by the NER system (e.g., there was little-to-no data available regarding the entities when the model is trained). In some cases, the number of named entities may be large and the NER system may not have learned rare or unpopular named entities. For example, the NER system may be trained to recognize song titles and the NER system may exhibit poor performance in recognizing unpopular song titles due to relative unpopularity of the song titles and the vast number of significantly more popular song titles. Further, the NER system may exhibit poor performance in recognizing new song titles even if produced by a popular artist as the NER system may not have learned to recognize new named entities that appear in the new song titles yet. Conventional NER systems may therefore be inadequate in the aforementioned situations. A customized NER system that is capable of recognizing tail distributions of named entities (e.g., rare or unpopular entities within a given dataset) may provide better accuracy in some cases. However, such a customized NER system may be expensive and labor-intensive to implement, update, and maintain.

Some aspects of this disclosure relate to training and using a NER system, portions of which are configured to receive augmented or otherwise modified input from a tuned gazetteer for generating NER results. A NER system that uses such gazetteer data is able to provide increased precision and recall in identifying named entities without significantly impacting computation speeds offered by conventional NER systems. The gazetteer data can provide a catalog of tokens (e.g., words or word groupings) that should be recognized by the NER system as a named entity. The gazetteer data can be based on a category of named entities that the NER system is configured to recognize. For example, if the NER system is configured to recognize brand names, a corresponding brand gazetteer can be a list of brands. The gazetteer data can be compiled in a number of ways including the use of corresponding experts to compile a list of named entities, web-scraping tools for periodically identifying named entities, internal databases, or existing annotated data.

In some embodiments, the NER system may be a linear model configured to identify tokens in natural language input as named entities. Gazetteer input can be added to one or more portions of the NER system to provide a boost to the probability that a token is an instance of a particular named entity based on whether the given token is part of the gazetteer. The probability boost provided by the gazetteer output data can further be adjusted by a weight learned during training. The weighted gazetteer output can provide further indications to the NER system that a token is a named entity. For example, a conventional NER system may determine a low probability that a token is a named entity. The gazetteer output may increase the probability that the token is a named entity based on the gazetteer data. Therefore, tokens that may not be recognized by a conventional NER system as named entities (e.g., unpopular or new instances of named entities such as brands, song titles, or the like) may be recognized as named entities by the disclosed NER system due to the addition of gazetteer data.

The NER system architecture can be configured as a multi-layer network to receive word and character embeddings and a gazetteer output for recognizing named entities. The NER system can divide an utterance into a plurality of subsets of word groupings, or n-grams, and each n-gram corresponds to n number of words. The NER system can further determine whether the n-grams are located in the gazetteer data. For example, a given input "buy coca cola and sprite" may be divided into the following n-grams: "buy," "coca," "cola," "and," "sprite," "buy coca," "coca cola," "cola and," "and sprite," etc. The NER system may then generate a gazetteer output indicating the n-grams of the input that are located in the gazetteer data.

In some embodiments, the gazetteer output (e.g., one or more vectors indicating whether each n-gram of a given input related to a user utterance is located in gazetteer data) is appended to an output of a prior layer of the NER system to generate an input vector for a subsequent layer of the NER system. The gazetteer output may include a plurality of vectors, where each vector represents gazetteer results for one or more n-grams of the user utterance. For example, a first vector may correspond to 1-grams, a second vector may correspond to 2-grams in the forward direction, and a third vector may correspond to 2-grams in the backward direction.

The NLP system may further include a word embedding module to generate the word and character embeddings. The word embedding module may be any conventional word embedding models. In some embodiments, the word embedding module may be implemented using GloVe models, fastText models, Word2vec models, ELMo models, or other word embedding modelling methods. The word embedding module may generate encoded representations of each word in the input in the relevant context. The encoded representations of the word embedding module, or information derived therefrom such as output of a bi-directional long shot-term memory model ("BiLSTM"), may be concatenated with the gazetteer output to generate an input vector for a subsequent layer of the NER system. The size of the input vector may be based on the number of vectors of the gazetteer output and can be of any size. The input vector may then be provided to the next layer of the NER system for recognizing named entities of a user utterance.

Further aspects of the present disclosure relate to tuning the gazetteer output for use in the NER system. The deterministic gazetteer output may be tuned for integration into an otherwise probabilistic NER system such that determinations of the gazetteer do not completely override the probabilistic analysis of other features. The tuning of the gazetteer output may involve training a weight used to adjust output of the gazetteer such that the NER system is not dominated by the gazetteer output. For example, the gazetteer output may be adjusted so that one or more tokens present in the gazetteer data are not always automatically recognized as a named entity by the NER system. To facilitate this, the gazetteer data for a given named entity classification may include tokens properly within classification (e.g., resulting in "true positives"), and may also intentionally include tokens not properly within the classification (e.g., resulting in "false positives"). By adjusting the tokens included in the gazetteer data, the NER system is able to tune the strength of the gazetteer during training and benefit from the tuned strength during use.

Various aspects of the disclosure will now be described with regard to certain examples and embodiments, which are intended to illustrate but not limit the disclosure. Although aspects of the embodiments described in the disclosure will focus, for the purpose of illustration, on a natural language processing system that receives spoken input in the form of user utterances and determines a user intent from that input based on named entities identified by a NER system, one skilled in the art will appreciate that the techniques disclosed herein may be applied to any number of software processes or applications performing NER. For example, a textual content item may be submitted by a user. As another example, the natural language processing system may be used to analyze publications and other network-accessible printed content, etc.

FIG. 1 illustrates an example environment in which a natural language processing system 100 may be implemented according to some embodiments. A user 104 may make utterances, such as spoken commands, queries, and the like. The utterance 102 may be in any language and any dialect. A client device 105 may capture audio of the utterance via a microphone 106 and generate signals for processing by the NLP system 110. For example, the microphone 106 may generate a signal with information regarding the captured audio of an utterance by the user 104, and the NLP system 110 may process the signal to generate a transcription of the utterance, generate a command in response to the utterance, and take some action in response to the command.

The microphone 106 may be integrated with, or in wired or wireless communication with, the NLP system 110. The microphone 106 may be integrated with, or in wired or wireless communication with, the client device 105 separate from the NLP system 110. For example, a user may make utterances captured by the microphone 106 of a client device, and the client device may provide a microphone 106 signal (or information derived therefrom) to the NLP system 110. The client device 105 can correspond to a wide variety of electronic devices, such as a computing device that includes one or more processors and a memory which may contain software applications executed by the processors. Illustratively, the client device 105 may be a personal computing device, laptop computing device, handheld computing device, terminal computing device, mobile device (e.g., mobile phones or tablet computing devices), wearable device configured with network access and program execution capabilities (e.g., "smart eye-wear" or "smart watches"), wireless device, electronic reader, media player, home entertainment system, speaker configured with network access and program execution capabilities (e.g., "smart speakers"), gaming console, set-top box, television configured with network access and program execution capabilities (e.g., "smart TVs"), or some other electronic device or appliance.

In various examples, an audio signal (and metadata or other associated data) may be sent to the NLP system 110 over one or more networks 108. The one or more networks 108 may include any viable communication technology, such as wired and/or wireless modalities and/or technologies. The one or more networks 108 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. Any of the one or more networks 108 may include, and/or may or may not have access to and/or from, the internet.

The NLP system 110 may include various components for providing the features described herein. In some embodiments, the NLP system 110 may include an ASR system 112 to process audio signals received from one or more devices including the microphone 106. The ASR system 112 may receive the audio signals or other audio data and generate textual data and/or other data representative of an utterance 102 of the user 104. The NLP system 110 may further include a NLU system 114 that contains a NER system 120 to recognize one or more named entities based on the textual data provided by the ASR system 112. The NER system 120 may include a plurality of layers configured to process the ASR output to recognize one or more named entities of the utterance. The NER system 120 may include one or more of: an embedding layer 122, a bidirectional long short-term memory ("BiLSTM") layer 124, and a conditional random field ("CRF") layer 126. Each layer may be configured to perform one or more operations on the ASR output and/or output of a prior layer in order to recognize named entities. The NLU system 114 may then generate NLU results based on the recognized named entities, ASR output, and/or other data. For example, the NLU results may include a semantic representation of an actionable command issued by a user as a spoken utterance.

The NLP system 110 may further include one or more gazetteers 125. Each of the one or more gazetteers 125 may include a plurality of data items (e.g., tokens, n-grams, etc.) corresponding to instances of particular named entities in order to aid the NER system 120 in recognizing named entities. The results of the one or more gazetteer lookups may be provided to one or more layers of the NER system 120 in order to provide further accuracy and precision in recognizing named entities. In some embodiments, the one or more gazetteer outputs may be concatenated with output of another component of the NLP system, such as an output of the BiLSTM layer 124, and provided to a further layer of the NLP system, such as the CRF layer 126.

The CRF layer (or another layer that receives gazetteer outputs and other NLP data) may then generate named entity recognition output based on the gazetteer and other NLP data. For example, a gazetteer output value for a particular n-gram may be a binary present/non-present indicator or some other deterministic representation of whether the n-gram is or is not present in the gazetteer. This deterministic gazetteer output data can be combined with probabilistic NLP data, such as the output of the BiLSTM layer 124. The gazetteer output data may be used as one feature of many in the determination of whether an n-gram is or is not a named entity. In some embodiments, to ensure that the deterministic output of the gazetteer is not treated as the sole or overriding source of information used in the named entity recognition determination, the gazetteer output may be weighted or otherwise adjusted with respect to the other features, such as probabilistic output of the BiLSTM layer 124, when used to recognize named entities. In this way, n-grams present in the gazetteer may receive a boost in the overall probability that they are recognized as named entities, while still allowing for the generalization power of the probabilistic BiLSTM layer 124. For example, the power to generalize the recognition of named entities and not rely solely or overwhelmingly on the gazetteer output can be important to the ability of the NER system 120 to recognize named entities that are not present in the gazetteer data (e.g., unpopular or new brands or song titles), or to recognize non-named entity uses of n-grams that are in the gazetteer data (e.g., words that are used in brand names and also other contexts in which they are not brand names).

The NLP system 110 may further include an applications system 128. The applications system 128 may be configured to initiate an appropriate application in response to the utterance of the user.

The NLP system 110 may respond to an utterance 102 of the user 104 by sending the response, via the network 108, to the client device 105 for performing one or more requested operations associated with the response. In some embodiments, the NLP system 110 may also include an applications system (not shown in FIG. 1) that includes or manages one or more applications to respond or otherwise act on the utterance 102 of the user 104, such as by providing requested content, performing requested operations, and the like. The applications system may operate an application either directly, via the network 108, or via another network. The example subsystems and components of the NLP system 110 shown in FIG. 1 are illustrative only, and are not intended to be limiting. In some embodiments, an NLP system 110 may have fewer, additional, and/or alternative components and data stores.

The NLP system 110 may be implemented on one or more physical server computing devices that provide computing services and resources to end-user devices, such as the client device 105. In some embodiments, the NLP system 110 (or individual components thereof) may be implemented on one or more host devices, such as blade servers, midrange computing devices, mainframe computers, desktop computers, or any other computing device configured to provide computing services and resources. For example, a single host device may execute one or more ASR systems 112, NER systems 120, gazetteers 125, some combination thereof, etc. The NLP system 110 may include any number of such hosts.

In some embodiments, the features and services provided by the NLP system 110 may be implemented as web services consumable via one or more communication networks. In further embodiments, the NLP system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

With reference to an illustrative embodiment, at [A] the user 104 can produce an utterance 102. The utterance 102 may be in response to a query, question, prompt, etc. from the client device 105 or the NLP system 110. The utterance 102 may be audio data or audio signals produced by the user 104.

At [B], the microphone 106 can receive audio from the user 104 representing the utterance 102. The microphone 106 can send the audio as an audio signal to the NLP system 110 via the network 108. The audio signal may be a recording or substantially real-time stream of the utterance 102 of the user 104 or the audio signal may include data derived from a recording or substantially real-time stream of the utterance 102 of the user 104.

At [C], the ASR system 112 can generate text data using the audio signal received at [B]. Illustratively, the text data may include one or more transcripts or other text data representative of words in the utterance 102. The ASR system may provide the data as an ASR output to the NER system 120 through the NLU system 114 and to the one or more gazetteers 125 in order to generate a gazetteer output at [D].

At [E], the one or more gazetteers 125 can provide one or more gazetteer outputs to be concatenated with the BiLSTM results and provided to the CRF layer 126 in order to provide further indications of a probability or likelihood that a given token is associated with a classification or category. The one or more gazetteers 125 may each include a gazetteer data set corresponding to a named entity classification. The gazetteer output may include a designation of whether each token of an utterance, or a subset thereof, is found in the gazetteer 125 (i.e., an indication of whether a particular token corresponds to the named entity classification). For example, a numerical value of "1" may indicate that a token is located in the gazetteer 125 and a numerical value of "0" may indicate that the token is not located in the gazetteer 125. A token being found in the gazetteer may be evidence that the token is (or is part of) a particular named entity. Subsequent layers the NLP model may therefore use the gazetteer output as a feature in recognizing named entities.

At [F], ASR output provided to the embedding layer 122 of the NER system 120 can be used by the embedding layer 122 in order to perform word embedding and/or character embedding. In some embodiments, the embedding layer 122 may be configured as a word embedding module. The embedding layer 122 can generate a word embedding output using the textual data received at [D]. The embedding layer 122 can receive an ASR output corresponding to an input string. For example, the embedding layer 122 can receive an ASR output of "Buy ten Acme widgets" which may be divided into a plurality of tokens such as "Buy," "ten," "Acme," "widgets." In other examples, one or more tokens may include a plurality of words. The embedding layer 122 may generate a plurality of word embedding outputs for each token. Each word embedding output may represent a corresponding word in a numerical manner. In some embodiments, a character embedding of a given word represented in numerical format may be generated prior to generation a word embedding, and the word embedding may be generated based on the character embedding instead of, or in addition to, the word text. At [G], the embedding layer 122 can provide the word embedding results to the BiLSTM layer 124.

At [H], the embedding results provided to the BiLSTM layer 124 can be used by the BiLSTM layer 124 to generate the BiLSTM data based on the embedding results. The BiLSTM results may represent probabilities that words are named entities. The BiLSTM layer 124 can generate one or more numerical values for each of the embedding results. For example, the BiLSTM layer 124 can generate a first numerical value (e.g., 0.5) representing a probability that "Acme" corresponds to an "Organization" and a second numerical value (e.g., 0.1) representing a probability that "Acme" corresponds to a "Person." It will be understood that the BiLSTM layer 124 can generate any number of numerical values for a given portion of the utterance. Each numerical value may correspond to a given category or classification associated with a named entity. Each token associated with an input vector of the embedding layer may receive a numerical value for each category or classification. For example, for the phrase "Buy ten Acme widgets," each of "Buy," "ten," "Acme," and "widgets" may receive a numerical value for the following named entity classifications: "Person," rganization," "Location," "Quantity," "Other," etc. Each token may correspond to BiLSTM results corresponding to a BiLSTM vector including a plurality of numerical values.

At [I], the BiLSTM layer 124 can provide the BiLSTM results. At [J], the BiLSTM results and the one or more gazetteer outputs can be concatenated as a concatenated output and can be provided to the CRF layer 126. In one embodiment, the BiLSTM results and the one or more gazetteer outputs can be concatenated by a concatenation layer. The one or more gazetteer outputs and the BiLSTM results may identify tokens within the same category or classification of tokens. For example, the BiLSTM results may provide a likelihood that a token is associated with a "Shopping Organization" and the one or more gazetteers may be configured to, by comparing a "Shopping Organizations" gazetteer data set with the token, provide an indication of whether the token is in the "Shopping Organizations" gazetteer data set.

At [K], the CRF layer 126 can receive the BiLSTM results and the gazetteer output and can predict one or more classifications or labels associated with a portion of the utterance 102. The CRF layer 126 may receive the BiLSTM results and the gazetteer output as separate inputs. In other embodiments, the CRF layer 126 may receive the BiLSTM results and the gazetteer output as a concatenated input. For example, the CRF layer 126 may receive the input vector <BiLSTM results, Gazetteer output>, where the BiLSTM results and the gazetteer output may be represented by a series of numerical values. Based on the BiLSTM results and the gazetteer output, the CRF layer 126 may predict whether a token corresponds to a given classification or label. The CRF layer 126 may be trained to apply a first weight for the BiLSTM results and a second weight for the gazetteer output. Further, the CRF layer 126 may identify additional constraints through training of the NLP system 110. For example, the CRF layer 126 may be trained to recognize that certain labels or classifications may only be associated with certain positions in the utterance. Further, the CRF layer 126 may be trained to recognize that certain labels or classifications are only identified in certain patterns (e.g., the CRF layer 126 may recognize that the classification "Organization type" and "Organization name" are typically found together). The NLU system 114 can generate NLU results based on the CRF layer 126.

At [L], the NLU system 114 can provide the NLU results to the applications system 128. The applications system 128 may select and initiate an appropriate application to generate a response or otherwise perform an action based on the labels or classifications predicted by the CRF layer 126. For example, the applications system 128 may include a collection of specialized applications, each directed to a specific domain of intents, and configured to respond to utterances determined to include intents in the corresponding domains. For example, the applications system 128 may include application in each of the music domain (e.g., music streaming services, music purchase services, etc.), video domain (e.g., video streaming services, video purchase services, etc.), household organization domain (e.g., calendars, reminders, timers, alarms, etc.), and other types of domains.

At [M], the NLP system 110 can transmit a response to the client device 105. The NLP system 110 can transmit the response to the client device 105 via the network 108. The client device 105 can process the response at [N] and can cause a response to be made to the utterance 102.

Figure 2:
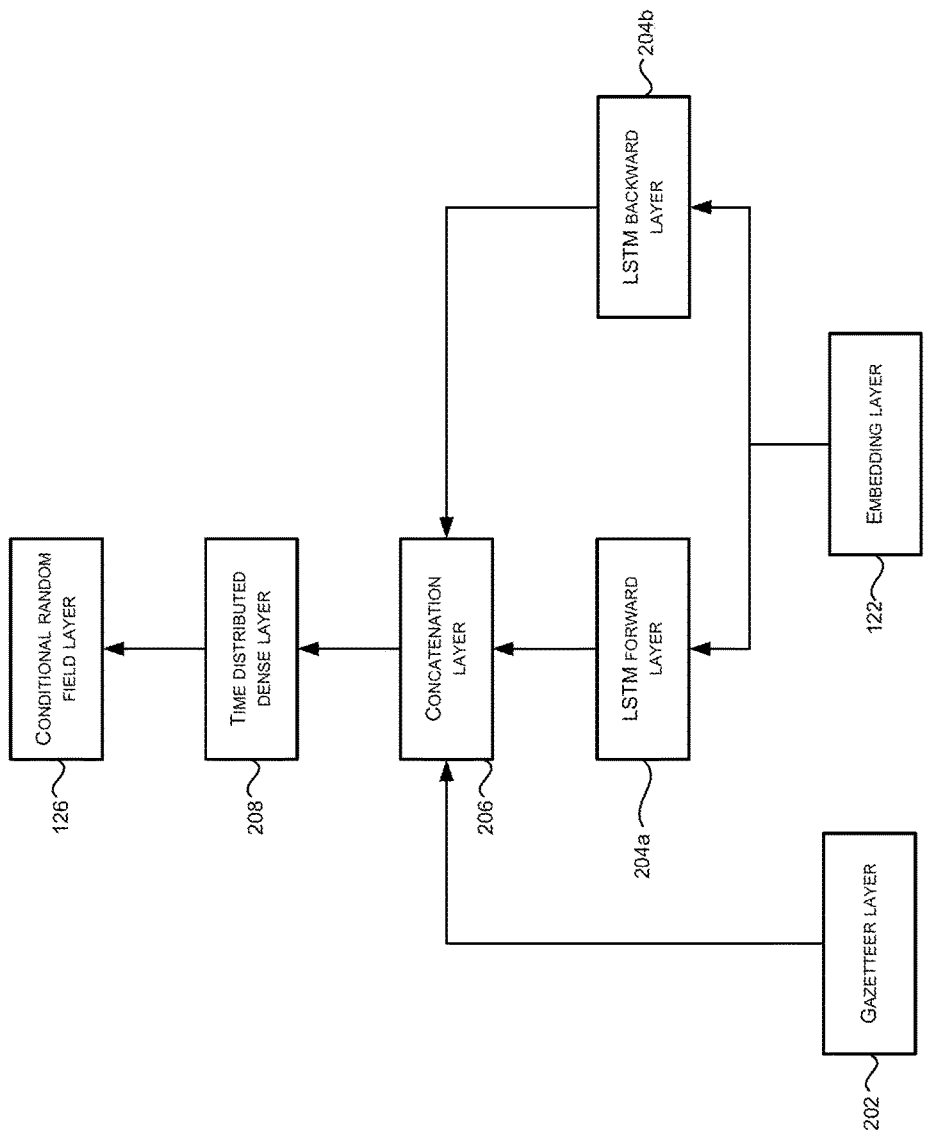
FIG. 2 depicts a schematic diagram of a named entity recognition system in accordance with aspects of the present disclosure.

FIG. 2 depicts a schematic diagram of a NER system 200 in order to predict one or more labels or classifications associated with a given token. The NER system 200 may be implemented as multiple layers of a neural network. The NER system 200 may include one or more of a: word embedding layer 122, BiLSTM layer 204a and 204b, concatenation layer 206, time distributed dense layer 208, and CRF layer 126. The NER system 200 may further include one or more hidden layers. The NER system 200 may iteratively predict, using the multiple layers, whether a word or word grouping is a named entity.

The NER system 200 may include an embedding layer 122 configured to receive ASR output and generate one or more embedding values for each token of the ASR output. The embedding layer 122 may perform a character embedding and/or word embedding on each token in order to generate a plurality of word embedding values for each token of the ASR output. The plurality of word embedding values may include a plurality of numerical values representing the given token. The embedding layer 122 may produce embedding results based on the character embedding and/or the word embedding and provide the embedding results to BiLSTM layer, the BiLSTM layer consisting of a long short-term memory ("LSTM") forward layer 204a and a LSTM backward layer 204b.

The LSTM forward layer 204a and the LSTM backward layer 204b may be configured as bidirectional recurrent neural networks capable of processing data by storing information about previous events in order to classify current or future events. The LSTM forward layer 204a may be trained to recognize dependencies between words in a forward direction and the LSTM backward layer 204b may be trained to recognize dependencies between words in a backward direction. Each layer may process the input simultaneously to determine an output. For example, for the phrase "Buy 10 Acme widgets," the LSTM forward layer 204a may be trained to recognize a relationship or dependency in the forward direction (e.g., between "Buy" and "Acme") and, for the same phrase, the LSTM backward layer 204b may be trained to recognize a relationship or dependency in the backward direction (e.g., between "widgets" and "Acme"). Such relationship or dependency may enable the LSTM forward layer 204a and the LSTM backward layer 204b to predict a word based on previous words and subsequent words in the phrase respectively. Each of the LSTM forward layer 204a and the LSTM backward layer 204b can be trained to recognize long-term dependencies between words using processing elements and non-linear feedback loops. Each of the LSTM forward layer 204a and the LSTM backward layer 204b may be configured as a multi-layer neural network capable of receiving information and storing it for a number of time periods in order to recognize relationships between later words. For example, the LSTM forward layer 204a and the LSTM backward layer 204b may include a sigmoid layer and a tanh layer. In some embodiments, the LSTM forward layer 204a and the LSTM backward layer 204b may be configured as a standard recurrent neural network or other neural network. In other embodiments, the NER system 200 may include only a uni-directional LSTM layer (e.g., an LSTM forward layer or an LSTM backward layer). The LSTM forward layer 204a and the LSTM backward layer 204b may generate respective outputs indicating dependencies and provide an indication of these dependencies to a concatenation layer 206.

The gazetteer layer 202 may include a gazetteer data set indicating words or word groupings that share a named entity classification, categorization, or grouping. The classification, categorization, or grouping of the gazetteer layer 202 may be dependent or linked to the NER system 200. For example, if the NER system 200 is configured to identify organizations, the gazetteer data set of the gazetteer layer 202 may be tokens categorized as organizations. In some embodiments, the gazetteer data set of the gazetteer layer 202 may be parsed to create a hash map of the gazetteer data set. The hash map may include a hashing of each word or word grouping of the gazetteer data set. Further, the gazetteer layer 202 may receive an input corresponding to a user utterance and the input may be divided into one or more word groupings associated with n-grams corresponding to the number of words in each grouping where n can be any number. Illustratively, the NER system 200 may be configured to generate n-grams for up to a predetermined number n. For each n-gram from n to 1, the gazetteer layer 202 may generate one or more word groupings associated with n-grams. The gazetteer layer 202 may further generate forward and backward n-grams. For example, for n=2 and the phrase "Buy ten Acme widgets," the gazetteer layer may generate word groupings associated with 2-grams forward, 2-grams backward, and 1-grams forward/backward (e.g., [buy ten, ten Acme, Acme widgets, NaN], [NaN, buy ten, ten Acme, Acme widgets], [buy, ten, Acme, widgets]). Each of the word groupings for each n-gram may be compared with the gazetteer data set of the gazetteer layer 202 (e.g., looked up in the gazetteer hash map) to identify word groupings found in the gazetteer data set. The word groupings may then be provided as a plurality of input vectors to the concatenation layer 206 corresponding to the n-grams in order to identify word groupings found in the gazetteer data set. For example, for the word grouping [buy, ten, Acme, widgets], the input vector [0, 0, 1, 0] may be generated indicating that "Acme" is found in the gazetteer data set.

The concatenation layer 206 may be provided the outputs of the LSTM forward layer 204a, the LSTM backward layer 204b, and the gazetteer layer 206. The concatenation layer 206 may concatenate each of the inputs into a respective input vector for each portion of a user utterance. In some embodiments, the concatenation layer 206 may append the outputs of the LSTM forward layer 204a, the LSTM backward layer 204b, and the gazetteer layer 206 into a respective input vector. Each input vector may then be provided to a time distributed dense layer 208.

The time distributed dense layer 208 may be a fully-connected subset of neural network layers (e.g., 1 or more layers) configured to apply weights and biases to input vectors, and compute the output of activation functions on the weighted/biased input vectors. The time distributed dense layer 208 can be provided a one or more input vectors from the concatenation layer 206. The time distributed dense layer 208 performs its operations the input vector(s) and then provides a one or more output vectors to the CRF layer 126.

The CRF layer 126 can be provided one or more output vectors from the time distributed dense layer 206. The CRF layer 126 can predict a likely sequence of labels or classifications corresponding to the plurality of output vectors. The CRF layer 126 may predict the likely sequence of labels based on identified labels before and/or after a given word in order to identify named entities.

Figure 3:
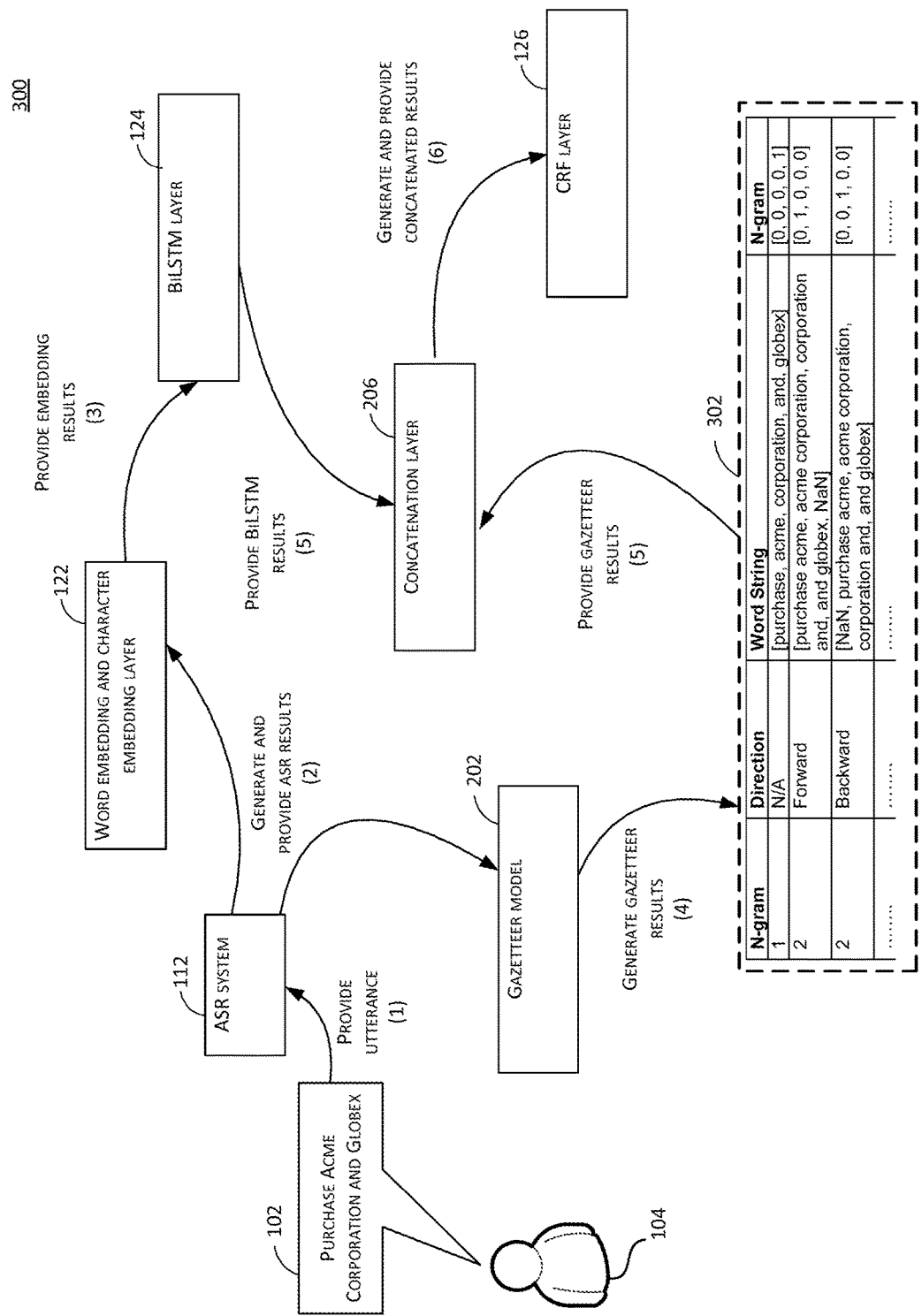
FIG. 3 depicts an example workflow for a natural language processing system generating a response to a user utterance according to some embodiments.

FIG. 3 depicts an example workflow 300 for an NLP system identifying named entities in response to audio of a user in accordance with aspects of the present disclosure. The NLP system may run automatically or the NLP system may be initiated based on a command prompt by a user. In some embodiments, the NLP system may determine one or more gazetteers to be used based on the utterance 102 and/or the user 104. For example, the NLP system may determine that a brand name gazetteer with a brand name gazetteer data set should be used to identify named entities associated with brand names. Further, the named entities may be associated with one or more data domains (e.g., a shopping data domain). For example, the NLP system may determine that a shopping data domain should be used based on performing speech recognition on an utterance 102 of the user 104 and/or based on data associated with the user 104 (e.g., the service(s) or system(s) associated with the user). In some embodiments, the NLP system may use all available gazetteers rather than selecting only a subset for use. In one embodiment, users of the NLP system may specify gazetteer to be used for operation of the NLP system. For example, users may specify a gazetteer including a shopping data domain that is provided to the NLP system for use in identifying named entities.

As shown in FIG. 3 at (1), the user 104 produces an utterance 102 corresponding to a given command, query, or another request. The utterance 102 may be received at a microphone or other application and subsequently provided to an ASR system 112 as audio data or an audio signal. In other embodiments, the utterance 102 may be provided directly to the ASR system 112. In the example of FIG. 3, the utterance 102 is "Purchase Acme Corporation and Globex" and the corresponding audio representation is provided to the ASR system 112. In the utterance 102, "Acme Corporation" and "Globex" may each correspond to a different brand name.

At (2), the ASR system 112 processes the utterance provided by the user 104 to determine a textual representation of the audio data corresponding to the utterance 102. The ASR system 112 may generate one or more textual representations or tokens for each portion of the utterance. The tokens may correspond to a word or words of the utterance 102. For example, for the phrase "Purchase Acme Corporation and Globex," the phrase may be divided into five tokens: "Purchase," "Acme," "Corporation," "and," "Globex." Further, at (2), the ASR system 112 generates and provides the ASR results to the gazetteer model 202 and the word embedding and character embedding layer 122. It will be understood that the ASR results may include any number of tokens depending upon the utterance, the configuration of the ASR system, etc.

At (3), the word embedding and character embedding layer 122 receives the ASR results and generates embedding results. The word embedding and character embedding layer 122 may be trained to perform word embedding and character embedding based on the ASR results in order to generate word embedding values and character embedding values for each of the ASR results. For each of the ASR results, the word embedding and character embedding layer 122 may generate or otherwise determine a value representing a given word, token, or character associated with the ASR results, and the value may further include, represent, or otherwise be associated with one or more features of the token learned by the word embedding and character embedding layer 122 during training. In some embodiments, the word embedding and character embedding layer 122 may perform one of word embedding or character embedding.

In the example of FIG. 3, the word embedding and character embedding layer 122 receives ASR results corresponding to the utterance 102 (e.g., "Purchase," "Acme," "Corporation," "and," "Globex"). The word embedding and character embedding layer 122 generates a value for each of the ASR results based on the word, token, or character in the ASR results. In some embodiments, the word embedding and character embedding layer 122 receives a first input to a character embedding portion, which generates one or more character embeddings for a given token, and a second input to a word embedding portion, which generates a word embedding for the given token. For example, for the token "Acme," the word embedding and character embedding layer 122 may be trained to determine a particular numerical representation each time that specific token is observed (until the word embedding and character embedding layer 122 is re-retrained).

Further, at (3), the word embedding and character embedding layer 122 provides the embedding results to the BiLSTM layer 124 in order to predict one or more labels associated with each token represented by the embedding results. The BiLSTM layer 124 may determine a probability or score for each token, the probability or score indicating a likelihood that a given token is associated with a given classification or label. Further, the BiLSTM layer 124 may determine a probability or score for each token according to multiple classifications or labels. For example, the BiLSTM layer 124 may determine a score for each token according to a "command" classification and an "organization" classification. In the example of FIG. 3, the BILSTM layer 124 may determine the following probabilities for each token: "Purchase=0.5 command, 0.1 organization," "Acme Corporation=0.3 command, 1.2 organization," "And=0 command, 0 organization," "Globex=0.2 command, 1.5 organization." Further, the classifications may further be delineated based on the position of the token relative to classifications of other tokens. For example, the BiLSTM layer 124 may determine score for each token according to the following classifications: "B-command," "I-command," "B-organization," "I-organization," "other," where the label B corresponds to a first word in a group of words sharing a classification (e.g., a command) and the label I corresponds to a subsequent word in a group of words sharing a classification. It will be understood that the BiLSTM layer 124 may determine any number of scores for any number of tokens according to any number of classifications.

At (4), the gazetteer model 202 receives the ASR results and compares the ASR results with a gazetteer data set associated with the gazetteer model 202 in order to generate gazetteer results 302 corresponding to whether a given token of the ASR results are found in the gazetteer data set. The gazetteer model 202 may perform one or more operations to compare the ASR results with the gazetteer data set of the gazetteer model in order to generate gazetteer results 302. The gazetteer model 202 may further determine a number n for generating n-grams where n can be any predetermined or dynamically-determined number. In some embodiments, the gazetteer model further generates gazetteer results 302 for each of the n-grams in the forward and backward direction. For a given n, the gazetteer model 202 may generate n-grams for n=n to n=1. In the example of FIG. 3, gazetteer model 202 is provided an indication that n=2 and the gazetteer model 202 generates a 2-gram backward, a 2-gram forward, and a 1-gram. In generating the n-grams, the gazetteer model 202 parses the ASR results accordingly to generate a word string for each n-gram. For 1-gram, the gazetteer model 202 generates the word string [purchase, acme, corporation, and, globex]. For 2-gram forward, the gazetteer model 202 generates the word string [purchase acme, acme corporation, corporation and, and globex, NaN]. For 2-gram backward, the gazetteer model 202 generates the word string [NaN, purchase acme, acme corporation, corporation and, and globex]. The gazetteer model 202 may then compare each token of each word string with a brand name gazetteer data set that includes tokens "acme corporation" and "globex," among others, to generate the following gazetteer results 302: (1-gram) [0, 0, 0, 0, 1], (2-gram forward) [0, 1, 0, 0, 0], (2-gram backward) [0, 0, 1, 0, 0]. In the example of FIG. 3, a value of "1" provides an indication that the corresponding token is located in the gazetteer data set and a value of "0" provides an indication that the corresponding token is not located in the gazetteer data set. In other embodiments, the gazetteer model 202 may use other values, words, or other indications that to indicate that a token is found in the gazetteer data set. In the example of FIG. 3, based on the n-grams, the gazetteer model 202 determines that the tokens "Acme Corporation" and "Globex" are found in the gazetteer data set.

At (5), the gazetteer model 202 provides the gazetteer results and the BiLSTM layer provides the BiLSTM results to the concatenation layer 206. The concatenation layer 206 may concatenate the BiLSTM results with the gazetteer results to generate an output vector for the CRF layer. Further, the BiLSTM results may be included in order to determine a likely sequence of labels or classifications.

At (6), the CRF layer 126 may receive a probability or other score and a gazetteer score or other value for each token and, according to the probabilities or scores, determine a likely sequence of labels for the input. Further, the CRF layer 126 may also determine the likely sequence of labels based on a gazetteer strength in order to determine a weight for the gazetteer results 302. In some embodiments, the gazetteer strength may be built into the CRF layer 126. For example, the gazetteer strength may be acquired by the CRF layer 126 during training to weight different incoming values accordingly. Therefore, the CRF layer 126 may determine a likely sequence of labels for the input that do not necessarily correspond to the highest probabilities for each token (e.g., due to the weighted gazetteer input). In other embodiments, the CRF layer 126 may determine a likely sequence of labels for the inputs that do correspond to the highest probabilities for each token (e.g., regardless of gazetteer input). In the example of FIG. 3, where the input is "Purchase Acme Corporation and Globex" and the tokens are "Purchase," "Acme Corporation," "and," and "Globex," the CRF layer 126 may determine the following sequence of labels for the tokens: <b-command, b-organization, organization, other, b-organization>.

Figure 4:
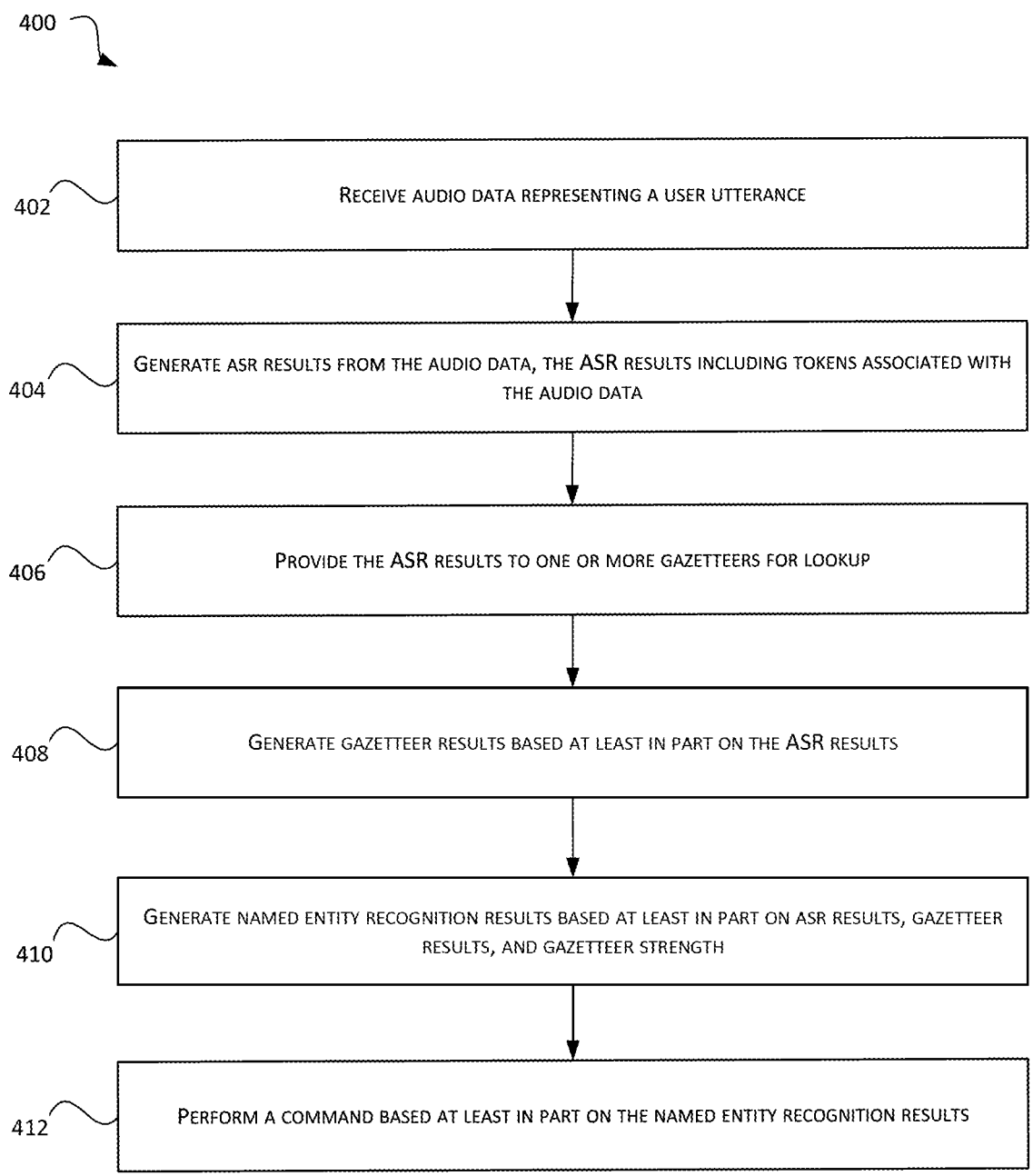
FIG. 4 is a flowchart of an example routine for implementing a natural language processing system using gazetteer-augmented named entity recognition according to some embodiments.

FIG. 4 describes an illustrative process 400 for performing NLP using an NER system trained to perform NER using both probabilistic machine learning data and deterministic gazetteer data. By using such a NER system, the NLP results may be more accurate for words that may be associated with multiple meanings or interpretations, and for words that are new or relatively unpopular instances of particular named entities. Further, the NLP results may be more accurate for words that are associated with certain label, category, or classification when used with respect to a specific system or service (e.g., a shopping service).

The process 400 begins at block 402. The process 400 may begin automatically upon initiation of an NLP session. For example, the process 400 may begin upon receiving a wake word such as "Hey" or "Computer." The process 400 may be embodied in a set of executable program instructions stored on a computer-readable medium, such as one or more disk drives, of a computing system of the NLP system. When the process 400 is initiated, the executable program instructions can be loaded into memory, such as RAM, and executed by one or more processors of the computing system. Upon initiation of the NLP session, at block 402, a device, such as a microphone or other computing device, may record an utterance by a user. The utterance may correspond to one or more words, sounds, or other audio data from one or more users. The device may process the utterance by the user and generate a corresponding audio signal. The audio signal may then be provided to the NLP system for further processing and generating a response to the utterance.

At block 404, the audio signal may be provided to an ASR system of the NLP system for automatic speech recognition. The ASR system can process the audio signal to generate text data (e.g., one or more likely textual representations or transcripts) of the utterance. The ASR system may generate a sequence of words, where each word corresponds to a textual representation of a portion of the audio signal and corresponding utterance.

At block 406, the ASR results may be provided to one or more gazetteers for lookups. Each gazetteer of the one or more gazetteers may correspond to a gazetteer data set associated with a named entity classification. For example, a first gazetteer may correspond to a brand name gazetteer data set, a second gazetteer may correspond to an item name gazetteer data set, a third gazetteer may correspond to a person gazetteer data set, etc. The ASR results may be provided to any number of gazetteers. Each gazetteer may further correspond to one or more data domains that may include a plurality of tokens (e.g., words or word groupings) that correspond to the gazetteer data set and the corresponding named entity classification. For example, for a gazetteer corresponding to a brand name gazetteer data set, a data domain may include a plurality of brand name tokens corresponding to a physical retail service or an online retail service and another data domain may include a plurality of brand name tokens corresponding to a food service.

At block 408, the one or more gazetteers may generate gazetteer results based at least in part on a respective gazetteer data set and the ASR results provided at block 406 in order to determine one or more tokens of the utterance that correspond to the respective gazetteer data set. The gazetteer results may further be generated at least in part on the one or more data domain. The one or more gazetteers may receive the ASR results as a plurality of tokens corresponding to a textual representation of the user's utterance. In one embodiment, the one or more gazetteers may determine corresponding tokens through a token-to-token comparison of the ASR results with each token of the one or more tokens of the gazetteer data set. In another embodiment, the one or more gazetteers may perform a hashing of the one or more tokens and determine corresponding tokens through a hash map. Based at least in part on the comparison of the tokens, the one or more gazetteers may further generate an indication of the tokens in the utterance that are within the gazetteer data set. For example, for the utterance "Purchase Acme Corporation and Globex fishing lures," the one or more gazetteers may recognize the tokens "Acme Corporation" and "Globex" based on a comparison with the brand name gazetteer data set, and may provide an indication of a positive comparison as the two tokens correspond to tokens of the gazetteer data set. Further, the one or more gazetteers may provide an indication of a negative comparison where one or more tokens of the utterance do not correspond to any tokens of the gazetteer data set.

At block 410, a NER system generates NER results for tokens of an utterance based at least in part on the ASR results generated at block 404, the gazetteer results generated at block 408, and a gazetteer strength. The NER system may provide the ASR results—or data derived therefrom, such as word embeddings and/or character embeddings—to one or more layers of a neural network (e.g., a BiLSTM layer) in order to generate probabilities or other scores to determine tokens of the utterance that are associated with named entities. As described in greater detail above, the gazetteer results may be concatenated or otherwise provided in connection with the probabilistic data to another layer of the NER system, such as a CRF layer. The CRF layer or otherwise next layer of the NER system may be configured with a weighting factor or another built-in gazetteer adjustment for determining named entity classifications for tokens using both probabilistic data and deterministic gazetteer data. The NER system may generate an output that includes a sequence of labels or classifications for the utterance identifying named entities of the utterance. The sequence of labels or classifications may represent a likely sequence of labels or classifications as determined by the NER system.

At block 412, an NLP system generates NLP results based at least in part on the NER results and performs a command based on the NLP results in order to determine the meaning or intent of the utterance and the intended command. The NLP system may process the NER results in order to generate a likely representation of the utterance. Further, the NLP system may take the NER results and other data, such as ASR results, and attempt to generate a semantic representation of the utterance based at least partly on the NER results. Based on the semantic representation of the utterance, the NLP system may interpret a meaning of the utterance and then implement that meaning. The NLP system may be configured to implement the meaning by determining that the utterance corresponds to a given command, request, etc. and then cause the command or request to be performed. In some embodiments, the NLP system may further be configured to parse and tag or annotate text (e.g., for the utterance "Purchase a Bike," tag "Purchase" with a Command tag). The NLP system may also be configured to determine a domain of an utterance in order to narrow the services or functionalities that may be relevant.

Figure 5:
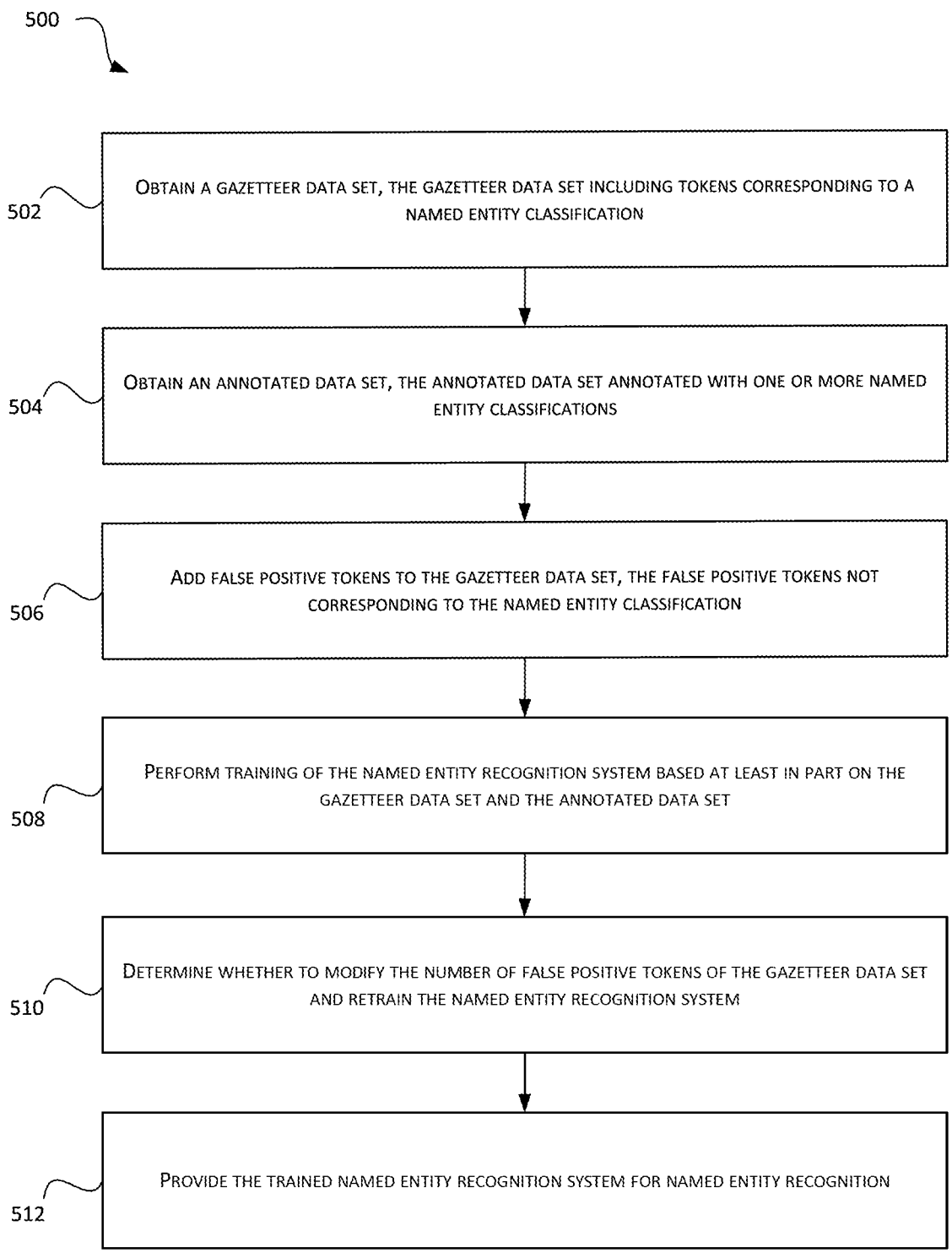
FIG. 5 is a flowchart of an example routine for training a named entity recognition system using gazetteer-augmented input according to some embodiments.

FIG. 5 describes an illustrative process 500 for training a NER system. The process 500 includes training an NER system based on both textual and gazetteer data for NLP. By such training, the trained NER system is trained to recognize named entities associated with one or more categories, classifications, or labels based on ASR results and gazetteer data. Advantageously, the trained NER system is able to produce NER results that consider the output of a gazetteer model while retaining a level of discrimination with regards to the output of the gazetteer model. For example, the trained NER system may determine that a token does or does not correspond to a named entity using, but not based solely upon, output of the gazetteer model. While the trained NER system may consider the output of the gazetteer model, the trained NER system may be configured such that the output of the gazetteer model is not determinative in the results of the trained NER system.

At block 502, a gazetteer data set may be provided to and/or otherwise accessed by the NLP system for training of an NER system. The gazetteer data set may be one of a plurality of available gazetteer data sets corresponding to a named entity classification such as brand names, item names, persons, locations, or the like. Further, a particular gazetteer data set may be associated with a certain data domain. For example, a brand name gazetteer data set may correspond to brand names associated with a shopping data domain (e.g., brand names heard or generated in the shopping context or associated with a shopping service). In order to aid in training the NER system, the gazetteer data set may provide an indication of the associated named entity classification.

At block 504, an annotated data set corresponding to tokens of training data annotated with one or more named entity classifications are obtained for training the NER system. Each token of the annotated data set may include one or more words or word groupings that correspond to one or more named entity classifications. The annotated data set may correspond to an utterance and named entity classifications associated with tokens of the utterance. The annotated data set may be used to train the NER system and determine whether the NER system, using gazetteer output, accurately classifies tokens based on the annotations corresponding to the annotated data set.

At block 506, false positive tokens are added to the gazetteer data set in order to modify a dependency of the NER system on the gazetteer. Each of the false positive tokens may include a token that does not correspond to the named entity classification of the gazetteer data set. As a result of the addition of the false positive tokens, the NER system may be trained to not be as reliant or dependent on the results of the gazetteer as would otherwise be the case if every positive result returned from a gazetteer lookup was indeed a proper identification of a named entity. For example, if the gazetteer returns a "1" during training (indicating that a token being looked up is in the brand name gazetteer data set of the gazetteer), when the token being looked up it is not actually a brand name, the model learns to not rely solely on the gazetteer. Rather, the model learns to use probabilistic data (e.g., from the BiLSTM layer) in addition to the deterministic data (e.g., from the gazetteer results) when making named entity recognition determinations. Thus, in response to the addition of the false positive tokens, the NER system may adjust the weight applied to the gazetteer during training.

At block 508, the NLP system trains the NER system based at least in part on the annotated data set and the gazetteer data set. The NER system may be trained to identify named entity classifications of the annotated data set based on the gazetteer data set and probabilistic data (e.g., from the BiLSTM layer). The NER system may generate NER results such that the NER output from the NER system is based at least in part on the gazetteer data set. The output data generated by the trained module may include a sequence of labels for each token of a given utterance.

At block 510, the NLP system receives the trained NER system and adjusts the number of false positive tokens of one or more gazetteers. In some embodiments, the NLP system may determine that the number of false positive tokens needs to be adjusted by searching a plurality of training results each with a different number of false positives in the gazetteer data set and selecting the number of false positives that corresponds to the best performance metrics. In some embodiments, the NLP system may determine that the system is overly reliant on a gazetteer, and increase the number of false positive tokens to decrease the reliance on the gazetteer. In other embodiments, the NLP system may determine that the system is not reliant enough on a gazetteer and decrease the number of false positive tokens to increase the reliance on the gazetteer.

At block 512, the NLP system provides the trained NER system for NER and NLP. The trained NER system may be used to perform named recognition of tokens based on gazetteer data associated with the tokens. As described herewith, the trained NER system may be used to more accurately predict the meaning of a word or word grouping based on its determined classification as a named entity. In some embodiments, the trained NER system may include computational components other than a neural network configured to generate NER results.

In some embodiments, the process 500 may return to block 502 where a NER system is generated for a different gazetteer data set. For example, if the NER system was first generated for a brand name gazetteer data set, the NER system may subsequently be generated for an item name gazetteer data set. Further, in other embodiments, the process 500 may return to block 502 where a NER system is generated for a different data domain. For example, an NER system may be trained for each data domain of a plurality of data domains within which the NLP system is configured to operate, such as shopping, music, directions, etc. each with a separate gazetteer data set(some, all, or none of which may be shared across data domains). In other embodiments, the NER system may be generated for a different gazetteer data set that correspond to the same named entity classification (e.g., item names, brand names, persons, locations, etc.). For example, a first gazetteer with a brand name gazetteer data set may be configured as a "head" gazetteer and a second gazetteer with a brand name gazetteer data set may be configured as a "tail" gazetteer where such a NER system can learn different weights for the different brand name gazetteer data sets. Use of multiple distinct gazetteers for the same named entity classification may be useful when different subsets of named entity tokens or other instances are associated with different patterns of usage, such as when one subset is significantly more popular than another subset.

Figure 6:
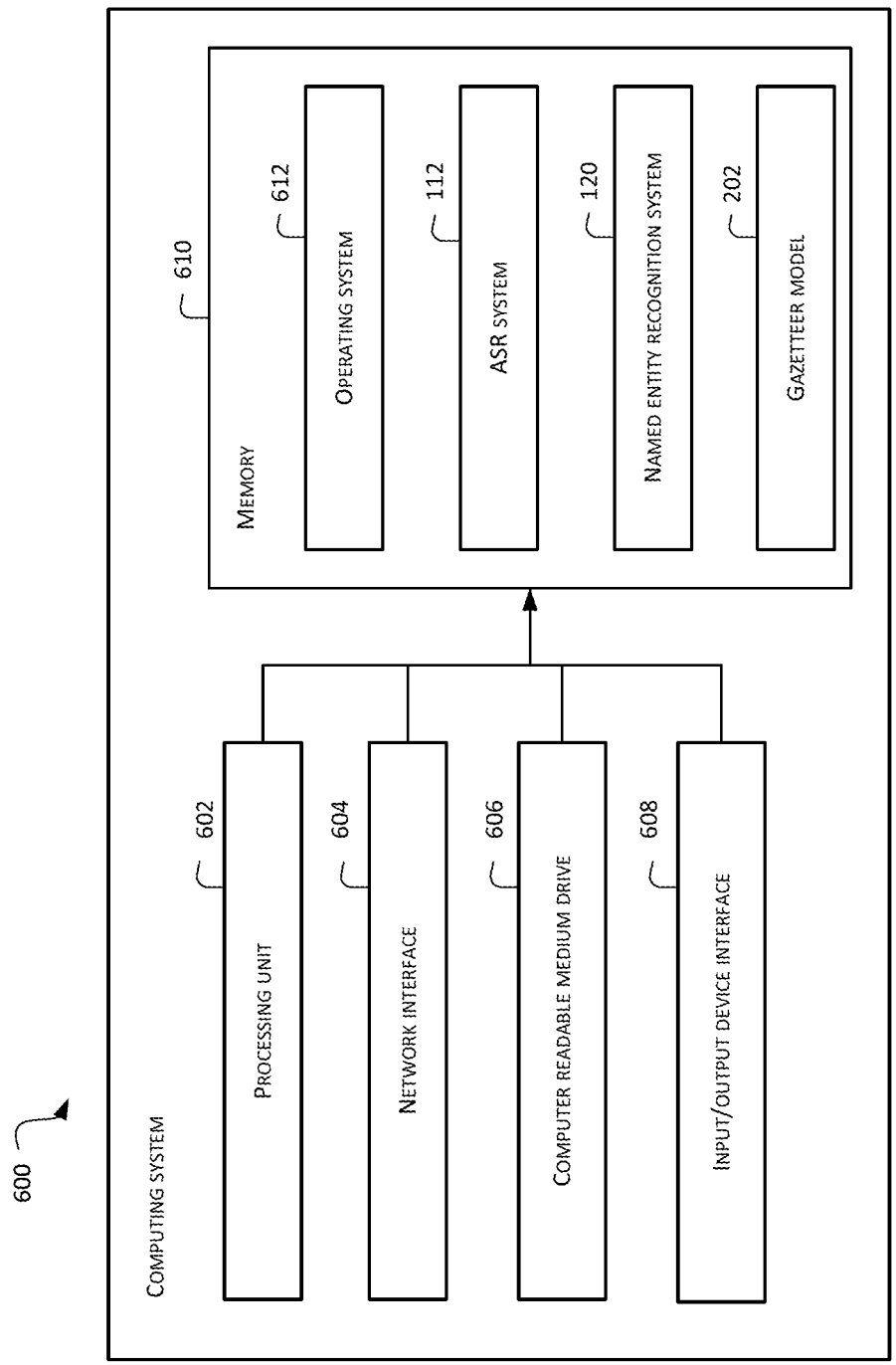
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include an ASR system 112. As another example, the computer-readable memory 510 may include a word embedding system 114. Further, the computer readable memory 510 may include an NLP system 116. In some embodiments, multiple computing systems 500 may communicate with each other via their respective network interfaces 504, and can implement speech processing and/or model training separately (e.g., each computing system 500 may execute one or more separate instances of the processes 300 and/or 400), in parallel (e.g., each computing system 500 may execute a portion of a single instance of a process 300 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more processors configured to execute specific instructions,
obtaining text data representing a natural language input, wherein the text data comprises a plurality of tokens;
generating a first output of a first probabilistic layer of a named entity recognition model based at least in part on a first token of the plurality of tokens, wherein the named entity recognition model is configured to recognize instances of a named entity;
generating a second output of a deterministic gazetteer based at least in part on the first token, wherein the second output indicates whether the first token is present in a gazetteer data set of the deterministic gazetteer;
generating a third output of a second probabilistic layer of the named entity recognition model based at least in part on the first output and the second output, wherein the second probabilistic layer weighs the second output relative to the first output in generating the third output, and wherein the third output represents a probability that the first token is an instance of the named entity; and
generating a semantic representation of the text data based at least in part on the third output.

2. The computer-implemented method of claim 1, further comprising adjusting a quantity of a first subset of token groupings present in the gazetteer data set to generate a tuned deterministic gazetteer, wherein each token grouping of the first subset of token groupings is associated with data indicating non-membership in a named entity classification, and wherein each token grouping of a second subset of token groupings present in the gazetteer data set is associated with data indicating membership in the named entity classification.

3. The computer-implemented method of claim 2, further comprising:
training the named entity recognition model using the tuned deterministic gazetteer to generate a trained named entity recognition model, wherein the second probabilistic layer weighing the second output relative to the first output is based at least in part on the trained named entity recognition model.

4. The computer-implemented method of claim 1, further comprising:
adding a second token to the gazetteer data set; and
recognizing the second token as an instance of the named entity based at least in part on the deterministic gazetteer.

5. The computer-implemented method of claim 1, further comprising:

generating one or more n-grams based on the text data, wherein each n-gram represents a portion of the text data comprising n number of words;

wherein generating the second output of the deterministic gazetteer is based at least in part on determining, for individual n-grams of the one or more n-grams, whether the individual n-gram is included in the gazetteer data set.

6. The computer-implemented method of claim 1, further comprising:

generating one or more forward n-grams based on the text data; and generating one or more backward n-grams based on the text data;

wherein each backward n-gram and each forward n-gram represents a portion of the text data comprising n number of words, and wherein generating the second output of the deterministic gazetteer is based at least in part on determining, for individual n-grams of the one or more forward n-grams and the one or more backward n-grams, whether the individual n-gram is included in the gazetteer data set.

7. The computer-implemented method of claim 1, wherein generating the second output comprises analyzing a hashing of the gazetteer data set.

8. The computer-implemented method of claim 1, further comprising concatenating the first output with the second output to generate a numerical vector, wherein generating the third output is further based at least in part on the numerical vector.

9. The computer-implemented method of claim 1, further comprising:

performing word embedding on the text data to generate a fourth output, the fourth output representing a numerical representation of the first token;

wherein generating the first output is further based at least in part on the fourth output.

10. The computer-implemented method of claim 1, wherein the deterministic gazetteer is a first deterministic gazetteer, wherein the gazetteer data set is a first gazetteer data set, and wherein the computer-implemented method further comprises:

generating a fourth output of a second deterministic gazetteer based at least in part on the first token, wherein the fourth output indicates whether the first token is present in a second gazetteer data set of the second deterministic gazetteer, wherein generating the third output is further based at least in part on the fourth output.

11. A system comprising:

computer-readable memory storing executable instructions; and one or more processors in communication with the computer-readable memory and configured by the executable instructions to at least:

obtain text data representing a natural language input, wherein the text data comprises a plurality of tokens;

generate a first output of a first probabilistic layer of a named entity recognition model based at least in part on a first token of the plurality of tokens;

generate a second output of a gazetteer based at least in part on the first token, wherein the second output indicates whether the first token is present in a gazetteer data set of the gazetteer;

generate a third output of a second probabilistic layer of the named entity recognition model based at least in part on the first output and the second output, wherein the second probabilistic layer weighs the second output relative to the first output in generating the third output, and wherein the third output represents a probability that the first token is an instance of a named entity; and generate a semantic representation of the text data based at least in part on the third output.

12. The system of claim 11, the one or more processors further configured to adjust a quantity of a first subset of token groupings present in the gazetteer data set to generate a tuned gazetteer, wherein each token grouping of the first subset of token groupings is associated with data indicating non-membership in a named entity classification, and wherein each token grouping of a second subset of token groupings present in the gazetteer data set is associated with data indicating membership in the named entity classification.

13. The system of claim 12, the one or more processors further configured to train the named entity recognition model using the tuned gazetteer to generate a trained named entity recognition model, wherein the second probabilistic layer weighing the second output relative to the first output is based at least in part on the trained named entity recognition model.

14. The system of claim 11, the one or more processors further configured to:

add a second token to the gazetteer data set; and recognize the second token as an instance of the named entity based at least in part on the gazetteer.

15. The system of claim 11, the one or more processors further configured to:

generate one or more n-grams based on the text data, wherein each n-gram represents a portion of the text data comprising n number of words;

wherein generating the second output of the gazetteer is based at least in part on determining, for individual n-grams of the one or more n-grams, whether the individual n-gram is included in the gazetteer data set.

16. The system of claim 11, the one or more processors further configured to:

generate one or more forward n-grams based on the text data; and generate one or more backward n-grams based on the text data;

wherein each backward n-gram and each forward n-gram represents a portion of the text data comprising n number of words, and wherein generating the second output of the gazetteer is based at least in part on determining, for individual n-grams of the one or more forward n-grams and the one or more backward n-grams, whether the individual n-gram is included in the gazetteer data set.

17. The system of claim 11, wherein to generate the second output the one or more processors are further configured to analyze a hashing of the gazetteer data set.

18. The system of claim 11, the one or more processors further configured to concatenate the first output with the second output to generate a numerical vector, wherein generating the third output is further based at least in part on the numerical vector.

19. The system of claim 11, the one or more processors further configured to:

perform word embedding on the text data to generate a fourth output, the fourth output representing a numerical representation of the first token;

wherein generating the first output is further based at least in part on the fourth output.

20. The system of claim 11, wherein the gazetteer is a first gazetteer, wherein the gazetteer data set is a first gazetteer data set, the one or more processors further configured to:
  generate a fourth output of a second gazetteer based at least in part on the first token, wherein the fourth output indicates whether the first token is present in a second gazetteer data set of the second gazetteer, wherein generating the third output is further based at least in part on the fourth output.

* * * * *